United States Patent [19]

Muñoz

[11] Patent Number: 5,600,869
[45] Date of Patent: Feb. 11, 1997

[54] SUNVISOR HINGE FOR AUTOMOBILES

[75] Inventor: José A. Muñoz, Rubi, Spain

[73] Assignee: Fico I.T.M., S.A., Barcelona, Spain

[21] Appl. No.: 491,885

[22] PCT Filed: Nov. 18, 1994

[86] PCT No.: PCT/ES94/00121

§ 371 Date: Aug. 24, 1995

§ 102(e) Date: Aug. 24, 1995

[87] PCT Pub. No.: WO95/14586

PCT Pub. Date: Jun. 1, 1995

[30] Foreign Application Priority Data

Nov. 25, 1993 [ES] Spain ..................................... 9302475

[51] Int. Cl.$^6$ ............................. E05C 17/64; E05D 11/08
[52] U.S. Cl. ............................................ 16/342; 296/97.12
[58] Field of Search ............................ 16/342, 261, 262,
16/263, 270, 382; 296/97.1, 97.9, 97.12, 97.13

[56] References Cited

U.S. PATENT DOCUMENTS

| | | | |
|---|---|---|---|
| 4,428,612 | 1/1984 | Viertel et al. | 296/97.12 |
| 4,469,367 | 9/1984 | Kuttler et al. | 296/97.9 |
| 4,854,629 | 8/1989 | Hagstrom | 296/97.13 |
| 5,011,211 | 4/1991 | Svensson | 296/97.1 |
| 5,039,153 | 8/1991 | Lindberg et al. | 296/97.13 |
| 5,366,265 | 11/1994 | Aymerich et al. | 296/97.12 |

FOREIGN PATENT DOCUMENTS 8902208  5/1989  Spain .

*Primary Examiner*—Chuck Y. Mah
*Attorney, Agent, or Firm*—Michael J. Striker

[57] ABSTRACT

A sunvisor for automobiles comprises a sunvisor body, a metal reinforcing rod which reinforces the sunvisor body and has two U-shaped ends, a retaining spring, a sunvisor hinge having a vertical arm attachable to a base member fitted to a structure of a vehicle and a horizontal arm snugly attachable to the retaining spring housed in the linking body so that the sunvisor may be rotated about a horizontal arm of the supporting pivot, the linking body being formed as an elongated parallelopipedon with two adjoining hollow longitudinal sections including a front section and a rear section separated from one another by a wall, the front section housing the retaining spring and being open at its free end and also having means for snugly receiving both ends of the metal ring reinforcing rod so that the ends are aligned longitudinally and left facing each other, means for fixing a position of the retaining spring, and means for fixing a position of one of the L-shaped ends of the metal reinforcing rod, the rear section of the linking body having one of its side faces open and being provided with means for fixing a position of the other of the U-shaped ends of the metal reinforcing rod, the front and rear sections being sized to receive the horizontal arm of the supporting pivot in a snug fit when the linking body and the metal reinforcing rod have been fitted together.

9 Claims, 3 Drawing Sheets

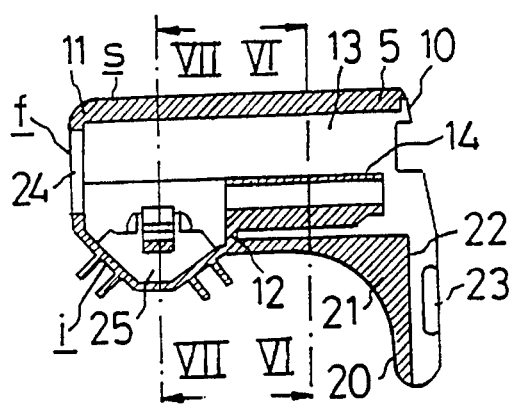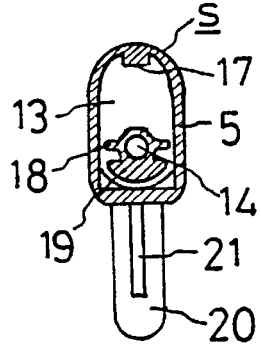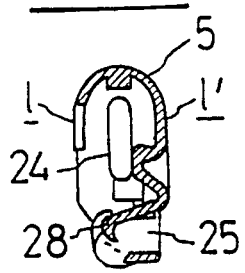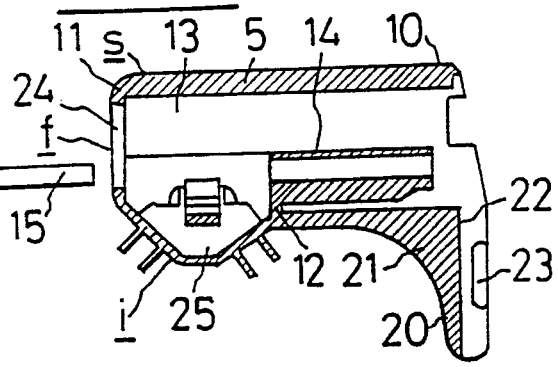

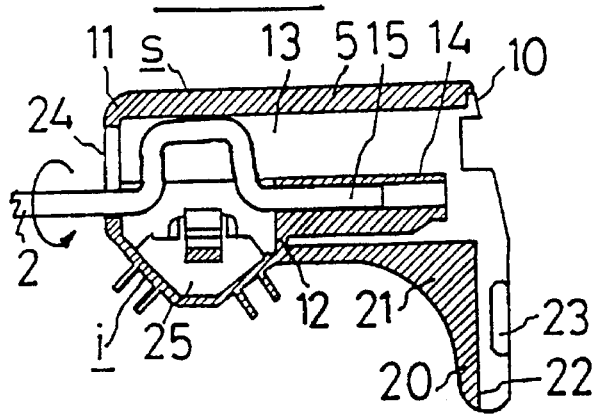
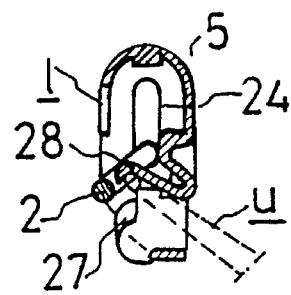
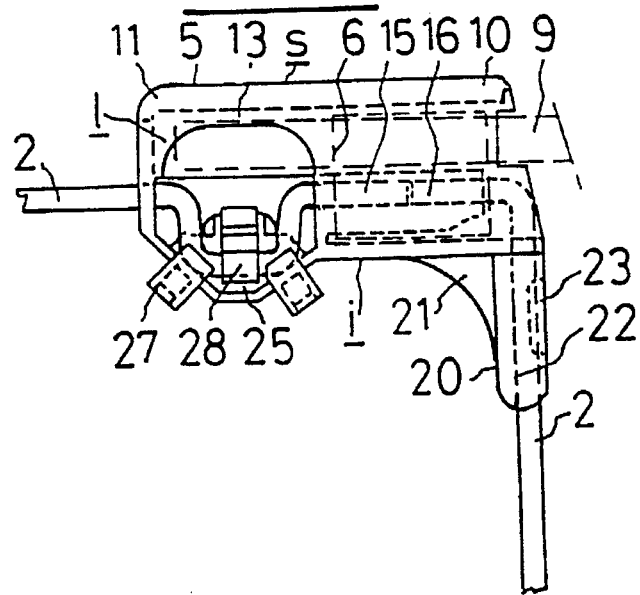

SUNVISOR HINGE FOR AUTOMOBILES

BACKGROUND OF THE INVENTION

The present invention is related to a hinge for sunvisors for automobiles which, specifically, is for application in connection with sunvisors based on a body obtained by the injection-moulding of a material of low specific gravity, such as polyurethane. The body includes a reinforcing frame consisting of a metal rod whose shape matches the shape of the visor body.

It is widely known that sunvisors, such as those described above and normally fitted as standard equipment in automobiles, have a hinge which enables the user to set the sunvisor to any of its usual positions for use in a stable way. The hinge consists basically of a bent supporting pivot attached to the vehicle's structure by means of a base member fitted to it, and of a retaining spring set inside a linking body, made generally in plastic materials, which is included in the body of the visor and firmly joined to the metal reinforcing rod. The retaining spring is sized to receive snugly the horizontal arm of the supporting pivot in such a way that the visor may be rotated around that pivot. Furthermore, both the spring and the horizontal arm of the supporting pivot possess complementary means for positioning them with respect to each other ensuring greater retaining strength in the rest position(s) of the visor, i.e. moving the visor away from those positions requires the user to exert a turning torque whose value is significantly higher than that required when the visor is not occupying its rest position(s).

By way of example of embodiments of sunvisor hinges such as those described above, Spanish utility model number U 8902208 may be quoted. It describes a linking body with an essentially quadrangular prismatic shape providing a housing for fitting a retaining spring and, around its edge, a recess such as to house a metal reinforcing rod shaped with a double bend, to prevent the linking body from changing its position once the linking body has been attached to the rod.

Known embodiments of linking bodies for sunvisor hinges such as that described above all suffer, wholly or partly, from the following drawbacks. Their use requires the metal reinforcing rod to have a closed perimeter, ie. that the ends of the metal rod be joined together, generally by welding. Moreover, the linking bodies are sizeable items as a result of having to withstand the high stresses to which they are subjected when the visor is positioned by the user, said size constituting a clear limitation on performance. These drawbacks lead to high fitting and/or manufacturing costs for the sunvisor, which significantly increase the price of the finished product.

SUMMARY OF THE INVENTION

Accordingly, it is an object of the present invention to provide a sunvisor hinge which solves the above-mentioned drawbacks —i.e. one not requiring the welding of the ends of the visor's metal reinforcing rod and not being large in size —a sunvisor hinge with a new structure for automobiles is disclosed.

The sunvisor hinge of the invention comprises the following known elements. A one-piece linking body, made preferably in plastic materials, having means for its firm attachment to the metal reinforcing rod of the sunvisor body, and with a housing for snugly receiving a retaining spring. A bent supporting pivot, of whose two arms, vertical and horizontal, the vertical one is attachable to a base member fitted to the structure of the vehicle, and the horizontal one, or pivot of rotation for the sunvisor, is snugly attachable to the retaining spring housed in the linking body in such a way that the sunvisor may be rotated around the horizontal arm of the supporting pivot.

The sunvisor hinge of this invention is characterized in that the essential shape of the linking body is an elongated parallelepipedon in which two adjoining hollow longitudinal sections, one in front and one behind, are present, of similar size, separated by the wall between them. The front section, which houses the retaining spring, is open at its free end and possesses means for snugly receiving both the free ends of the metal reinforcing rod, in such a way that said ends, aligned longitudinally, are left facing each other; means for fixing the position of the retaining spring; and means for fixing the position of an L-shaped end of the metal reinforcing rod. Furthermore, the rear section of the linking body has one of its side faces open, and possesses means of fixing the position of the other U-shaped end of the metal reinforcing rod. These two sections, front and rear, are sized to receive the horizontal arm of the supporting pivot in a snug fit when the linking body and the metal reinforcing rod have been fitted together.

In the front section of the linking body, the means for snugly receiving the two free ends of the metal reinforcing rod have a tubular extension which, arising in the interior wall, comes out in the rear section and extends until it reaches the open end of the front section. The means which fix the position of the retaining spring possess, on the upper face of the linking body, a longitudinal rib, and in the tubular extension, two diametrically arranged radial ribs and a tangential extension which run all along its length; these ribs and tangential extension are sized in such a way that, when the retaining spring is housed in the front section, they prevent the spring from being moved away from the position taken up. Furthermore, the means which fix the position of the relevant end of the metal rod have an orthogonal extension of relatively short length set in the open end of the front section, and this extension has a slot running all along its length with retaining projections for gripping, through successive elastic deformations of the side walls of said longitudinal extension, a section of the metal reinforcing rod.

In the rear section of the linking body, the means which fix the position of the other end of the metal reinforcing rod comprise, on the front face, which is the one opposite the front section, a through-slot arranged centrally and in parallel to the open side face, and in the lower face, which is the face forming a dihedron with said front face and open side, a recessed housing, basically U-shaped, in which retaining projections are arranged, preferably three in number, two on the sides and one in the middle. The through-slot and the recessed housing are sized in such a way that the relevant end of the metal rod, which has a U shape similar to the shape of the recessed housing, may be passed inside the rear section through the through-slot, and its free end be inserted into the tubular extension of the front section, in such a way that the metal rod may be rotated around the axis defined by the tubular extension and be firmly fitted in said recessed housing after elastic deformations of the retaining projections.

Preferably, when coupling the U-shaped end of the metal rod with the linking body, the central retaining projection is elastically deformed by means of a tool designed for the purpose, in such a way that, during said rotation of the metal rod, the rod elastically deforms the other two retaining projections on the side and, when the U-shaped section of the metal rod is inside the recessed housing, the central projection elastically reassumes its initial position on ceasing to apply the tool. Naturally, this tool arrangement for the elastic deformation of the central retaining projection does not affect the function assigned to the side retaining projections.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

FIG. 5 is a view of section V—V shown in FIG. 3.

FIG. 6 is a view of section VI—VI shown in FIG. 5.

FIG. 7 is a view of section VII—VII shown in FIG. 5.

FIGS. 8, 9, 10 and 11 are respective views showing successive stages in the coupling of the two ends of the metal reinforcing rod of the sunvisor and the linking body of the hinge of this invention.

DESCRIPTION OF PREFERRED EMBODIMENTS

Figure 1:
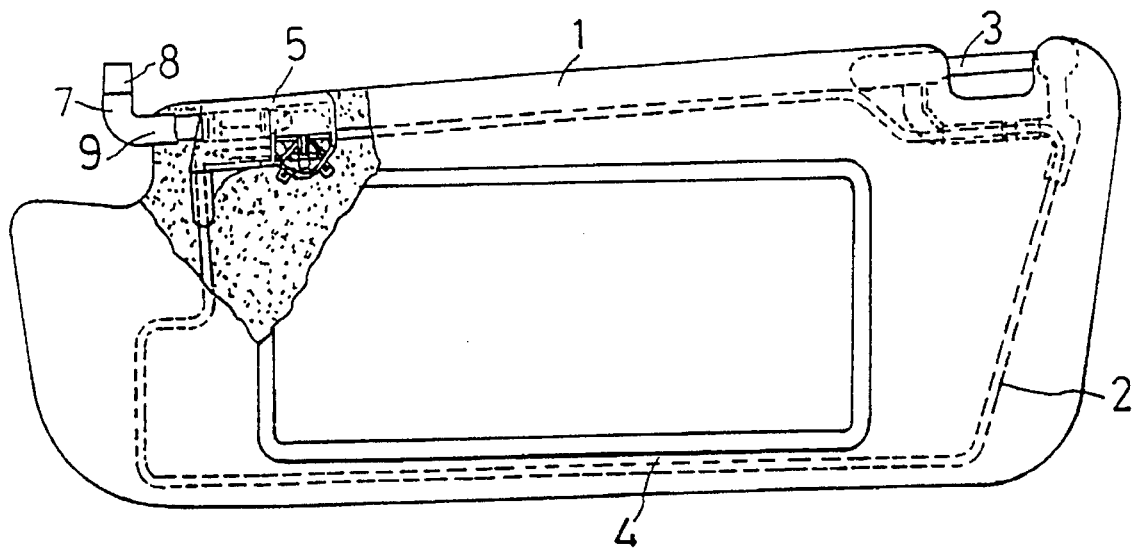
FIG. 1 is a side view of a sunvisor hinge incorporating the hinge of this invention.

The sunvisor hinge for automobiles of this invention, which is described as an example of embodiment, is applicable, as shown in FIG. 1, to sunvisors. In particular, it can be used in a sunvisor housing visor body 1, generally made by injection-moulding polyurethane, which incorporates the metal rod 2, of circular section, that acts as a structural reinforcing part and which, as shown in FIG. 1, has a shape which is very similar to that of the body 1. In this example of application of the hinge of this invention, the sunvisor shown in FIG. 1 also has a hanging bridge 3 and a mirror 4, known as a "vanity mirror". Both the body 1, the bridge 3 and the mirror 4, and indeed the metal rod 2 itself, are given only as a non-restrictive example of the application possibilities of the hinge of this invention, since all these items may take on other forms and layouts suitable to any given case of application without this affecting the essence of the invention.

The hinge of this invention comprises the linking body 5, in which the retaining spring 6 is housed, as shown schematically by dotted lines in FIG. 11, and the supporting pivot 7 shown in FIG. 1. The linking body 5 and the supporting pivot 7, respectively, are made preferably of plastic materials of suitable mechanical properties, and the retaining spring 6 is made preferably of very flexible metal sheet. FIG. 1 shows how the supporting pivot 7 has a bent shape. Its vertical arm 8 may be attached to a base member on the vehicle structure, this not being shown in the drawings. Its horizontal arm 9, which is shown schematically in FIG. 11 by dotted lines, is housed inside the linking body 5 and in such a way that, when subjected to compression by the retaining spring 6, it enables the user to rotate the sunvisor around the horizontal arm 9 and set it in a stable fashion to any of its normal positions for use.

The above is well known and customarily used for many known embodiments of hinges for sunvisors based on a visor body produced by the injection moulding of a light material.

Figure 2:
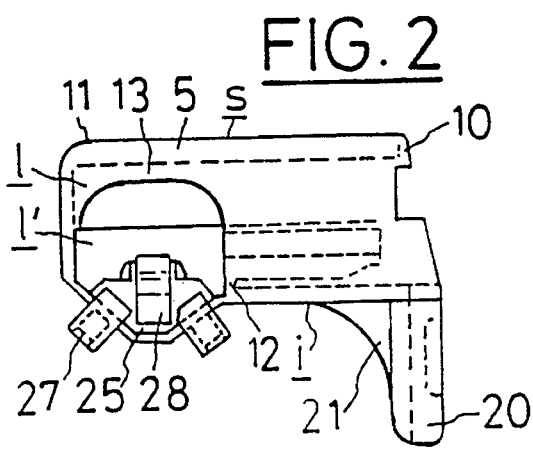
FIG. 2 is a side view of the linking body of the hinge of this invention.
Figure 3:
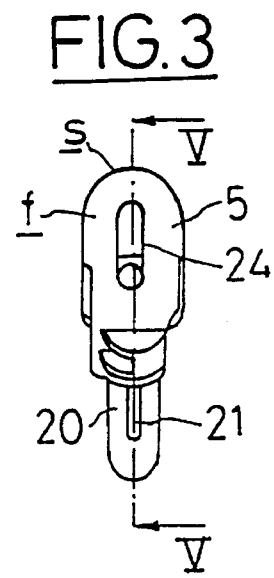
FIG. 3 is a front view of the linking body of the hinge of this invention.
Figure 4:
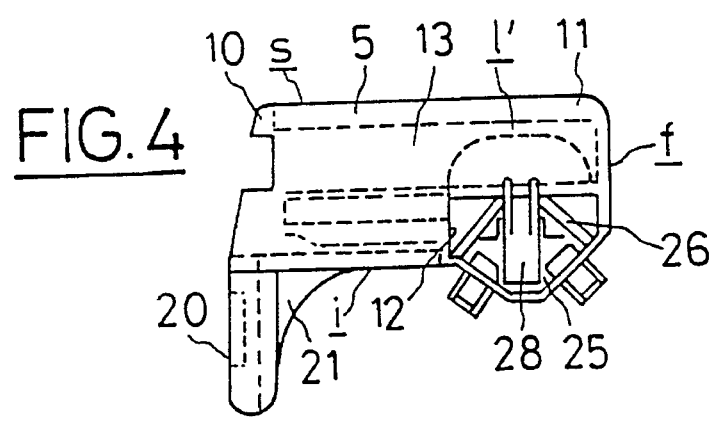
FIG. 4 is another side view of the linking body of the hinge of this invention.

FIGS. 2, 3 and 4 show how the linking body 5 is shaped essentially as an elongated parallelepipedon with rounded edges, in which two longitudinal sections of similar length may be observed, the front section 10 and the rear section 11 respectively, shown in FIGS. 5, 8 and 9. These sections 10 and 11 are separated by the inner wall 12 which, as shown in FIGS. 5, 8 and 9, arise in the lower face i of the linking body 5, and also make up the longitudinal housing 13 in which the horizontal arm 9 of the supporting pivot 7 may be inserted, as shown in FIG. 11.

FIGS. 5, 6 and 8 show how the front section 10 includes the tubular extension 14 which, arising in the inner wall 12, extends to reach the open end of section 10. This tubular section 14, which comes out in the rear section 11, is sized, as shown in FIG. 11 by dotted lines, snugly to receive both the free ends 15 and 16 of the metal reinforcing rod 2, in such a way that both the free ends, 15 and 16, are lined up longitudinally together.

The position occupied by the retaining spring 6 in the front section 10 is set by the longitudinal rib 17 lying along the upper face s of the linking body 5, and by the two diametrically opposed radial ribs 18, and by the tangential extension 19 of the tubular extension 14, as shown in the section view given in FIG. 6, and by dotted lines in FIG. 11.

FIGS. 2, 4, 5, 8, 9 and 11 show how, at the open end of the front section 10, there is an orthogonal extension 20 with a reinforcement 21 acting as a supporting bracket, which runs for a relatively short length. Extension 20 has, on its exterior face as shown in FIGS. 5, 8 and 9, the U-shaped longitudinal slot 22 in which the two retaining projections 23 are arranged opposite each other. This longitudinal slot 22 is sized to grip the section of the metal reinforcing rod 2 near its free end 15, as shown by dotted lines in FIG. 11.

FIGS. 2, 7 and 11 show how the rear section 11 of the linking body 5 has one of its side faces l open, like a window, and its front face f, which is the face opposite the front section 10, bears the central through-slot 24 which, as shown in FIG. 3, is set in parallel with respect to the open side face l. This through-slot 24 is sized in such a way that, as shown in FIG. 9, the metal reinforcing rod 2 can go through it. Furthermore, as shown in FIGS. 3, 5, 8, 9 and 11, the lower end of the central slot 24 is aligned longitudinally with the hole of the tubular extension 14 of the front section 10, in such a way that a rotational axis is defined, as shown in FIG. 9.

FIGS. 2, 4, 5, 8, 9 and 11 show how the lower face i of the linking body 5, which is the face that forms a dihedron with the front face f and the open side face l, forms a recessed and basically U-shaped housing 25. Reinforcing ribs 26 shown in FIG. 4 give it high mechanical resistance to deformation. FIGS. 2 and 11 show how the lower face i has two identical retaining side projections 27. And FIG. 7 Shows in cross-section how the side wall 1', which is the one opposite the open side wall 1, has the central retaining projection 28. The retaining projections 27 and 28 fix the section of the metal reinforcing rod 2 fitted in the recessed housing 25 formed by the lower face i as shown in FIG. 11.

The coupling of the linking body 5 of the sunvisor hinge of this invention to the metal reinforcing rod 2 of the body 1 of the visor requires, firstly, that the retaining spring 6 be housed in the front section 10 of the linking body 5. Its position is set by the action of the longitudinal rib 17 and the tubular extension 14 by means of its two radial ribs 18 and the tangential extension 19. Secondly the sections of the metal rod 2 near its free ends 15 and 16 are arranged as shown in FIG. 11. The section near the free end 16, which is attachable to the lower section 10 of the linking body 5, is L-shaped, and the section near the free end 15, which is attachable to the rear section 11 of the linking body 5, is U-shaped. On this basis, the coupling of the linking body 5 with the metal rod 2 is performed as follows: firstly, the free end 15 is inserted into the tubular extension 14 of the front section 10 through the through-slot 24 of the front face f of the rear section 11, in such a way that the U-shaped section of the metal rod 2 is arranged in the front section 11 as shown in FIG. 9. Then next, the metal rod 2 is turned around its turning axis formed by the tubular extension 14 and the lower end of the through-slot 24. This turning of the rod 2 is continued until the retaining projections 27 and 28 are reached, at which point greater turning torque needs to be applied to rod 2 in order to provoke an initial elastic deformation of the retaining projections 27 and 28 and in such a way that the U-shaped section of rod 2 comes to occupy recessed housing 25 of the rear section 11, as shown in FIG. 11. When the elastic deformation force ceases to be applied to the retaining projections 27 and 28, they spring back elastically to their initial position, preventing this free end of the rod 2 from coming away from the linking body 5. Next, the free end 16 of the metal rod 2 is inserted in the tubular extension 14 of the front section 10 and, simultaneously, the straight section of the other end of rod 2 is pressed into the longitudinal slot 22 of the orthogonal extension 20, in such a way that the retaining projections 23 arranged on said slot 22 prevent this end of the rod 2 from coming away from the linking body 5. Once the linking body 5 has been coupled to the metal rod 2, as shown in FIG. 11, in which its free ends 15 and 16 are longitudinally aligned, the visor body 1 may then be injected, and subsequently the horizontal arm 9 of the supporting pivot 7 may be fitted in the longitudinal housing 13, as shown in FIG. 1.

Preferably, when coupling the U-shaped metal rod 2 to the rear section 11 of the linking body 5, the elastic deformation of the central retaining projection 27 is performed with the assistance of the tool u provided for the purpose and shown schematically by dotted lines in FIG. 10. Thus, turning the U-shaped rod 2 results in the elastic deformation of the two lateral retaining projections 27, while the elastic deformation of the above-mentioned central projection 28 is achieved using said tool u. In this way, once the U-shaped rod 2 has been fitted in the recessed housing 25, the lateral retaining projections 27 reassume their initial position due to elastic action, and when the tool u ceases to be applied to the central retaining projection 28, it too springs back to its initial position, preventing the linking body 5 from coming away from the metal rod 2, as previously stated.

It will be understood that each of the elements described above, or two or more together, may also find a useful application in other types of constructions differing from the types described above.

While the invention has been illustrated and described as embodied in a sunvisor hinge for automobiles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A sunvisor for automobiles, comprising a sunvisor body; a metal reinforcing rod which reinforces said sunvisor body and has two ends; a linking body attached to said reinforcing rod; retaining spring housed in said linking body; a sunvisor hinge having a vertical arm attachable to a base member fitted to a structure of a vehicle and a horizontal arm snugly attachable to said retaining spring, housed in said linking body so that the sunvisor body is rotatable about said horizontal arm of said sunvisor hinge, said linking body being formed as an elongated parallelopipedon with two adjoining hollow longitudinal sections including a front section and a rear section separated from one another by a wall, said front section housing said retaining spring and being open at its free end and also having means for snugly receiving both ends of said metal reinforcing rod so that said ends are aligned longitudinally and left facing each other; means for fixing a position of said retaining spring; and means for fixing a position of one of said ends of said metal reinforcing rod, said rear section of said linking body having one of its side faces open and being provided with means for fixing a position of the other of said ends of said metal reinforcing rod, said front and rear sections being sized to receive the horizontal arm of said sunvisor hinge in a snug fit when said linking body and said metal reinforcing rod have been fitted together.

2. A sunvisor as defined in claim 1, wherein said linking body is composed of a plastic material.

3. A sunvisor as defined in claim 1, wherein said means for snugly receiving said ends of said metal reinforcing rod include a tubular extension which, arising from said wall of said linking body comes out in said rear section and extends until it reaches said open end of said front section.

4. A sunvisor as defined in claim 3, wherein said means for fixing a position of said retaining spring include a longitudinal rib provided on an upper face of said linking body and two diametrically arranged radially radial ribs and a tangential extension provided in said tubular extension running along a length of said tubular extension, said ribs and said tangential extension being sized so that when said retaining spring is housed in said front section of said linking body, they prevent said retaining spring from being moved away from a position taken up.

5. A sunvisor as defined in claim 3, wherein said other end of said reinforcing rod is U-shaped, said means for fixing a position of the other end of said metal reinforcing rod including a through-slot provided in said rear section on a front face which is opposite to said front section and arranged centrally and parallel to said open side face of said rear section, and a substantially U-shaped recessed housing provided in a dihedron shaped lower face of said rear section and having retaining projections, said through-slot and said recessed housing being sized so that said other U-shaped end of said metal rod passes inside said rear sections through said through-slot and said free end of said metal rod is inserted in said tubular extension of said front section so that said metal rod be rotatable around an axis defined by said tubular extension and firmly fitted in said recessed housing after elastic deformations of said retaining projections.

6. A sunvisor as defined in claim 5, wherein said retaining projections include two side projections and one central projection.

7. A sunvisor as defined in claim 6, wherein said central retaining projection is formed so that when attaching said other U-shaped end of said metal rod to said linking body, said central retaining projection is elastically deformable by a tool in such a way that during rotation of said metal rod, said metal rod elastically deforms said side projections when said other U-shaped end of said metal rod is inside said recessed housing, said central projection elastically reassuming its initial position on ceasing to apply the tool.

8. A sunvisor as defined in claim 6, wherein said one end of said metal reinforcing rod is L-shaped, while said other end of said metal reinforcing rod is U-shaped.

9. A sunvisor as defined in claim 1, wherein said means for fixing a position of an end of said metal rod include an orthogonal extension having a relatively short length and set in said open end of said front section, said extension having a slot running all along a length of said extension and provided with retaining projections for gripping a section of said metal reinforcing rod.

* * * * *